March 29, 1960     D. W. VOORHEES, SR     2,930,631
TRAILER STEERING MECHANISM
Filed Nov. 13, 1957     4 Sheets-Sheet 1
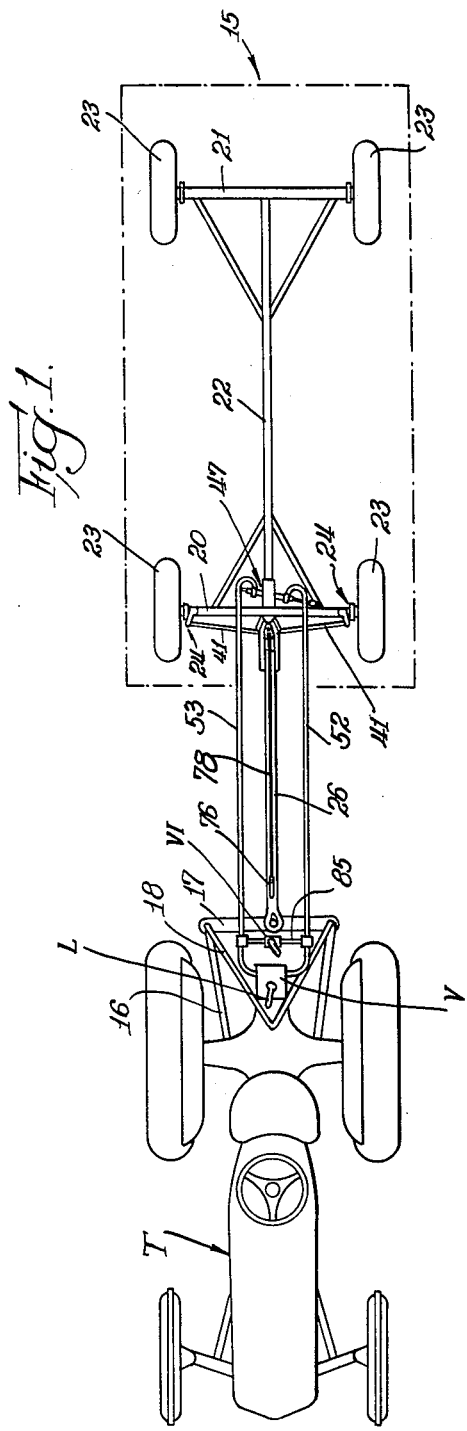
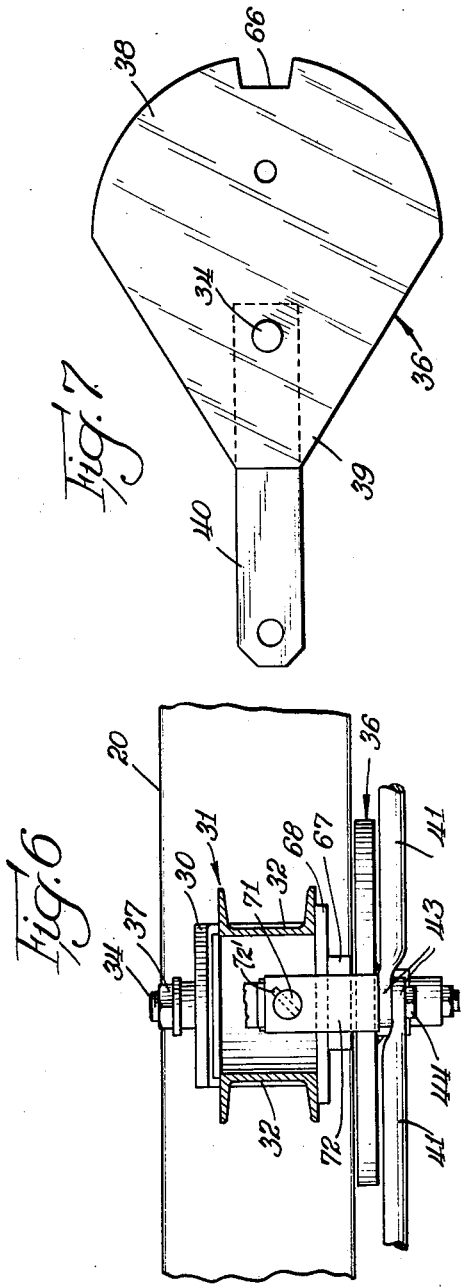
INVENTOR.
Daniel W. Voorhees, Sr.
BY
Carlson, Pitzner, Hubbard & Wolfe
Attys.

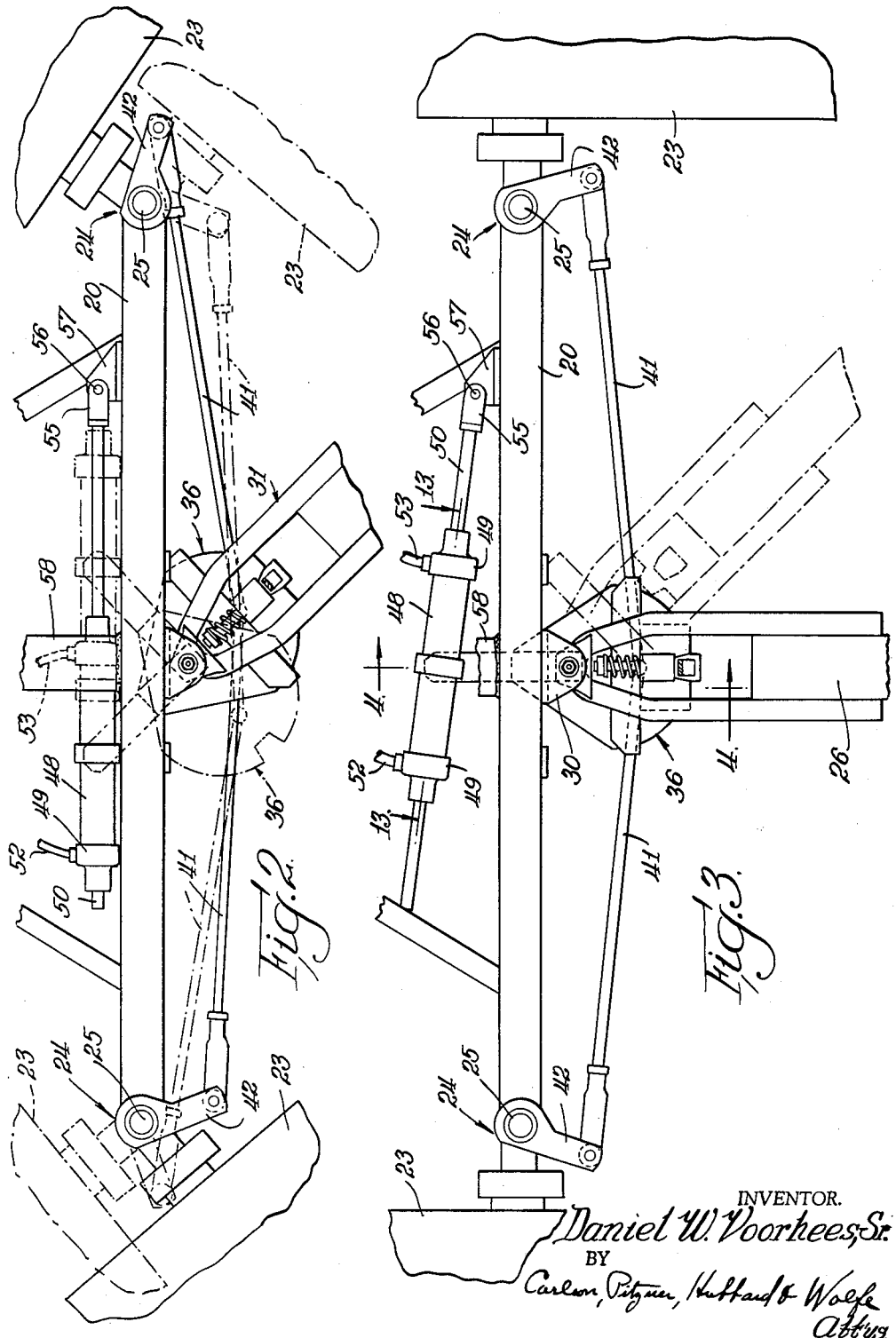

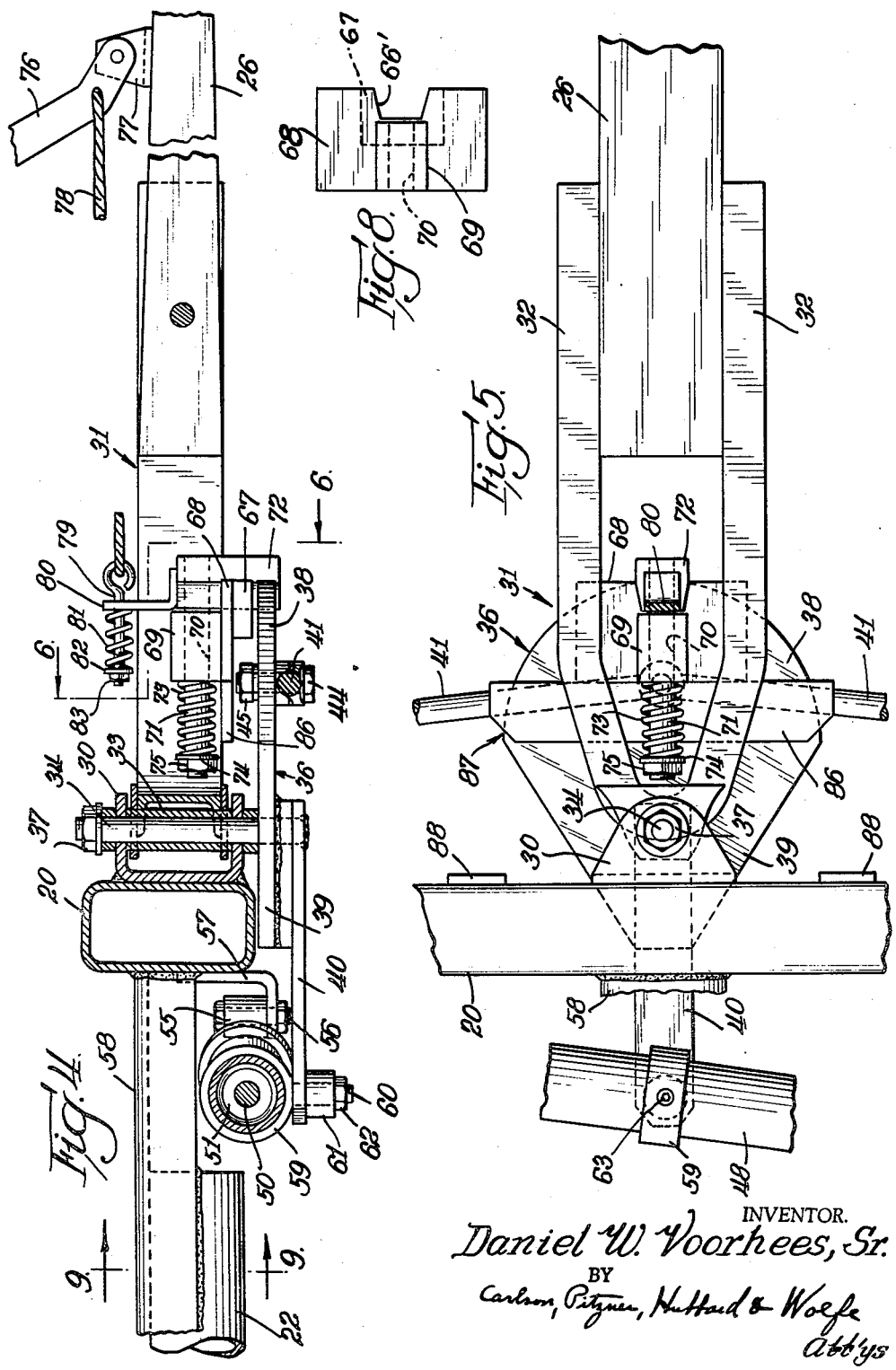

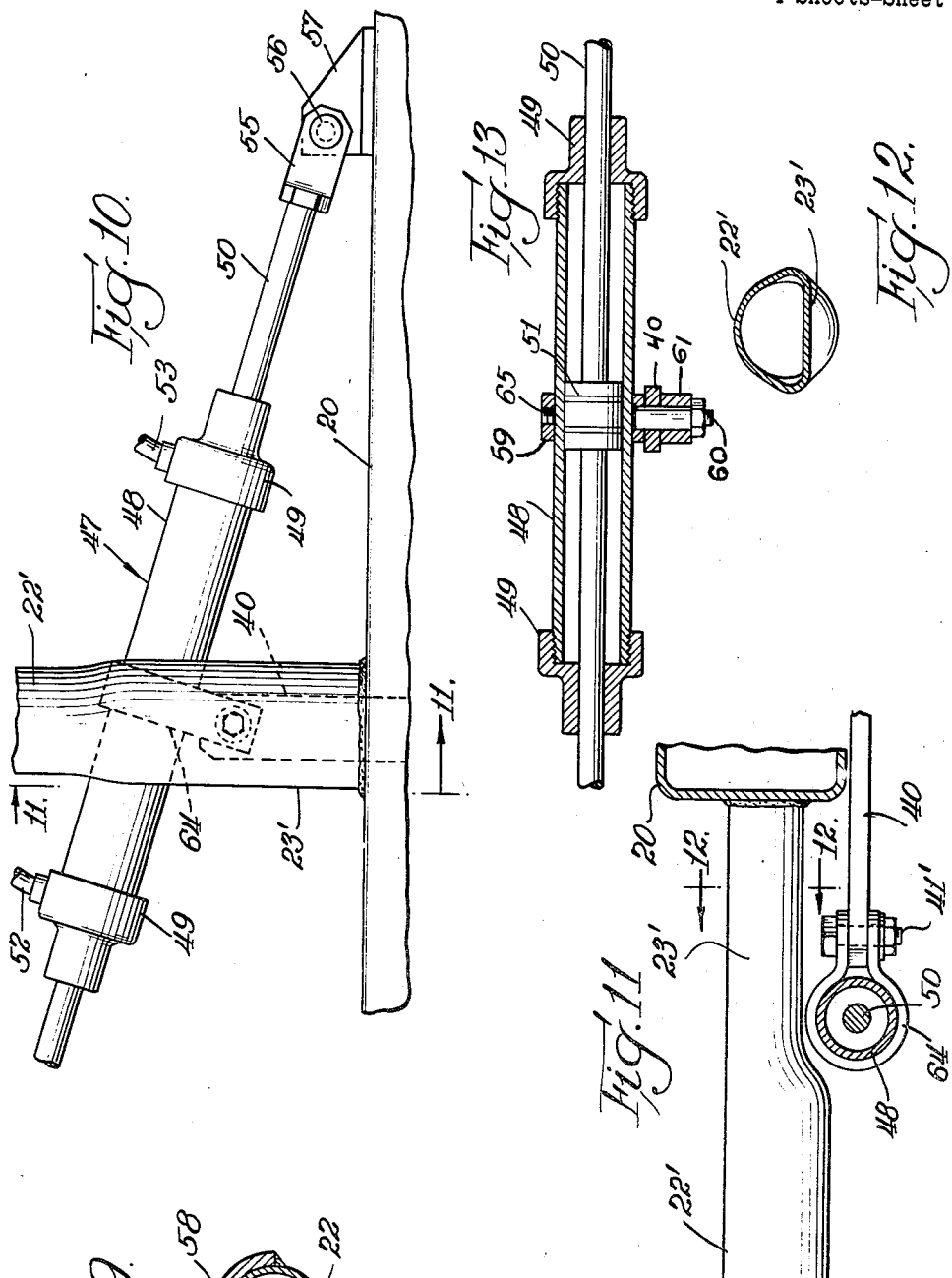

United States Patent Office 2,930,631
Patented Mar. 29, 1960

2,930,631

TRAILER STEERING MECHANISM

Daniel W. Voorhees, Sr., Quincy, Ill., assignor to The Firestone Tire & Rubber Company, Akron, Ohio, a corporation of Ohio Application November 13, 1957, Serial No. 696,204

5 Claims. (Cl. 280—445)

The invention relates to vehicles of the type commonly known as trailers and more particularly to improved power operated mechanism for steering such vehicles when towed by a powered vehicle such as a tractor.

One object of the invention is to provide a trailer particularly well adapted for towing by a farm tractor or the like and embodying improved hydraulically operated steering mechanism powered from the tractor hydraulic system and capable of being easily and accurately controlled by the driver of the tractor.

Another object is to provide a trailer adapted to be connected to a tractor or other towing vehicle through the medium of a pivoted pole or tongue and having steering mechanism for the road wheels embodying novel means by which the steering mechanism may be connected alternatively to a pressure fluid operated actuator powered by and controlled from the tractor or to the pole by which the trailer is towed.

Another object is to provide improved pressure fluid operated steering mechanism that can be incorporated in conventional trailers with a minimum of alteration or change in the body of the trailer.

Still another object is to provide hydraulically operated steering mechanism for trailers characterized by its simple, rugged construction and its efficiency and dependability in operation.

Other objects and advantages of the invention will become apparent from the following detailed description of the preferred embodiment illustrated in the accompanying drawings, in which Figure 1 is a diagrammatic view of a tractor coupled to a trailer equipped with steering mechanism embodying the features of the invention.

Fig. 2 is a fragmentary plan view of the running gear at the front end of a trailer showing the road wheels turned to one limited position.

Fig. 3 is a view similar to Fig. 2 showing the road wheels in straight-ahead position.

Fig. 4 is an enlarged fragmentary sectional view taken in a plane substantially on the line 4—4 of Fig. 3.

Fig. 5 is a fragmentary plan view showing details of the latch means forming a part of the steering mechanism.

Fig. 6 is a sectional view taken in off-set planes substantially on the line 6—6 of Fig. 4.

Fig. 7 is a top view of the operating plate constituting a part of the steering mechanism.

Fig. 8 is a plan view of the guide for the operating plate latch bolt.

Fig. 9 is a sectional view taken in a plane substantially on the line 9—9 of Fig. 4.

Fig. 10 is an enlarged fragmentary view showing the mounting of the cylinder and piston actuator for the steering mechanism in a trailer employing a modified form of reach.

Fig. 11 is a fragmentary view partly in section taken in a plane substantially on the line 11—11 of Fig. 10.

Fig. 12 is a sectional view taken in a plane substantially on the line 12—12 of Fig. 11.

Fig. 13 is a sectional view through the hydraulic actuator of the steering mechanism taken on a plane substantially on the line 13—13 of Fig. 3.

While the invention has been shown and is described in some detail with reference to a particular embodiment and modifications thereof, there is no intention that it be limited to such detail but on the contrary, the intention is to cover all alternative constructions, modifications and equivalents falling within the spirit and scope of the invention as defined in the appended claims.

By way of illustration, the invention has been shown as installed in a four-wheeled trailer 15 adapted to be coupled to and towed by a conventional tractor T. The tractor shown is a Ferguson-type tractor having draft links 16 carrying a drawbar 17 held in position by stabilizer bars 18. Such tractors are equipped with hydraulic systems including a source of fluid under pressure, such as a pump, and a sump or reservoir for storing the oil or other fluid used in the hydraulic system. Provision is usually made for convenient tapping of the hydraulic system to supply fluid under pressure to auxiliary equipment including implements or the like coupled to the tractor. In the present instance, a reversing or direction control valve V is provided for controlling connections between the pressure fluid source and reservoir and the auxiliary actuator, the valve being operable manually as by a hand lever L.

While the invention is applicable to various types of trailers, the particular trailer shown is of the four-wheel type. The trailer has a chassis including rigid front and rear axles 20 and 21 connected by a reach 22 with appropriate bracing to the two axles. Each axle mounts a pair of road wheels 23 preferably fitted with pneumatic tires. The front wheels of the trailer are mounted on steering knuckles 24 pivotally connected to the axles by king pins 25 permitting the wheels to be turned in the usual manner for steering purposes. A pole or tongue 26 pivotally attached at one end to the front axle and having its other end constructed for releasable attachment to the tractor, in this instance, the drawbar 17 provides the draft connection by which the trailer is towed.

In the exemplary trailer the front axle 20 is formed from a tubular structural member of rectangular cross section. For attachment of the pole 26 a U-shaped clevis 30 is welded to the front face of the axle approximately at its midpoint. The pole, as shown in Figs. 4-6, terminates at an elongated connecting bracket 31 consisting, in this instance, of a channel member bent back upon itself to form parallel legs 32 spaced apart to receive the pole and adapt it to be bolted thereto. The legs 32 of the bracket taper to present a V-shaped nose to which is welded an upright sleeve 33 dimensioned to fit within the clevis 30. A hitch bolt 34 inserted through the sleeve and through alined holes in the legs of the clevis pivotally connects the pole to the axle.

As shown in Fig. 4, the hitch bolt 34 is welded or otherwise rigidly secured at its lower end to an operating plate 36 which accordingly, can pivot on a common axis with the pole. A nut 37 threaded on the upper end of the hitch bolt holds the parts in assembled relation. In the preferred form shown in Figs. 4, 5 and 7 the operating plate 36 has a semi-circular front portion 38 and an integral frustoconical rear portion 39, the hitch bolt being secured substantially at the center of the latter portion. Also welded to the rear portion of the operating plate is a rigid rearwardly projecting arm 40 affording means for operatively connecting the plate with a power actuator.

The operating plate 36 comprises one element of a linkage which acts to maintain the front wheels 23 of the trailer in alinement and to swing them in unison for steering purposes. To this end the plate 36 is connected by tie rods 41 with arms 42 (Figs. 2 and 3) rigid with the respective steering knuckles 24 and projecting radially relative to their king pins 25. For connection with the operating plate, each tie rod is formed with an eye 43 apertured to receive a pivot bolt 44 extending through a hole provided in the forward portion 38 of the operating plate and secured in place by a nut 45. The axis of the bolt 44 is located fowardly of the axis of the hitch bolt 34 upon which the operating plate pivots so that movements of the plate are transmitted to and effect proportionate turning of the steering knuckles and associated ground wheels.

In accordance with one aspect of the invention hydraulically operated means is provided for swinging the operating plate 36 to position the trailer wheels for steering in a selected direction. The hydraulic means, in its preferred form, comprises a pressure fluid operated actuator 47 including a cylinder 48 (Figs. 2, 3, 10 and 13) closed at opposite ends by heads 49. Each head is apertured for reception of a piston rod 50 which extends entirely through the cylinder and to which is fixed a piston 51 having a working fit with the cylinder. Fittings are provided at each end of the cylinder for connection of conduits 52 and 53 through which fluid under pressure may be supplied to either end of the cylinder and spent pressure fluid from the other end of the cylinder returned to the sump or reservoir.

As herein shown, one end of the piston rod 50 is pivotally anchored to the front end of the axle 20 and is thus held against axial movement. For this purpose, the piston rod is fitted with an L-shaped connector 55 apertured to receive a pivot bolt 56 which connects it to an L-shaped bracket 57 welded to the rear face of the axle 20.

The cylinder 48 is suitably connected with the operating plate 36 so as to swing the plate on its pivot as the cylinder slides along the piston rod 50 under the influence of pressure fluid supplied to one or the other end of the cylinder. The connection with the operating plate may take various forms, depending upon the clearance available at the forward end of the reach 22 for the accommodation of the cylinder. In the trailer shown in Figs. 4 and 9, the reach 22, which is a tube of circular cross section, is terminated short of the axle 20 and connected therewith by a semi-cylindrical extension 58 welded to the reach and to the axle. This affords sufficient clearance for the cylinder 48 to overlie the arm 40 of the operating plate as shown in Fig. 4.

In the trailer exemplified above the cylinder is operatively conencted wtih the operating plate by a cylinder trunnion pivot having an annular portion 59 dimensioned to receive the cylinder. Integral with this annular portion is a pivot pin 60 projecting radially and adapted to be received in a socket 61 provided on the arm 40. A nut 62 threaded on the end of the pin retains the parts in assembled relation. The annular portion 59 of the trunnion is secured against movement relative to the cylinder either by being welded thereto or by means of a clamping screw 63 (Fig. 5).

An alternative form of cylinder trunnion pivot may be employed when the clearance available below the reach is insufficient to allow the cylinder to extend over the arm 40 of the operating plate. Thus, when the trailer has a reach 22' such as that shown in Figs. 10–12 of the drawings in which the forward end portion 23' is flattened to afford a relatively shallow recess, the cylinder 48 is extended along the end of the arm 40. To accommodate the cylinder in this position, the trunnion conveniently comprises a metal strap 64 having its central portion bent into annular configuration to fit around the cylinder 48. The ends of the strap are spaced apart to straddle the arm 40 and apertured to receive a pivot bolt 41' which secures the trunnion to the arm. It will be understood that the trunnion may be secured to the cylinder by welding or by clamping screws as desired.

The hydraulic actuator 47 may be supplied with pressure fluid from any suitable source. When the trailer is coupled to a tractor such as the tractor T shown, the conduits 52 and 53 are connected to the valve V on the tractor. This valve may be of any suitable type having a neutral position in which the fluid supply is shut off from both conduits and two operated positions. In one of the operated positions the conduit 52 is connected to the pressure fluid source on the tractor and the conduit 53 connected to the sump or reservoir. In the other operated position of the valve, the connection of the conduits is reversed. Shifting of the valve is effected by the hand lever L which is preferably located in a position in which it is conveniently accessible to the driver of the tractor.

In the exemplary steering mechanism, the hydraulic system is so arranged that pressure fluid is supplied to the actuator via conduit 52 to shift the cylinder 48 to the left as viewed in Fig. 2. Fluid from the other end of the cylinder is returned to the tractor reservoir through the conduit 53. The operating plate 36 is accordingly swung in a clockwise direction from the straight-ahead position in which it is shown in Fig. 3. Through the linkage including the tie rods 41, the steering knuckles 24 and the associated ground wheels are turned for steering the trailer leftward.

Upon shifting of the valve V to its alternate position, pressure fluid supplied to the right end of the cylinder via conduit 53 shifts it to the right. Fluid from the left end of the cylinder is then returned to the reservoir through the conduit 52. Movement of the cylinder swings the operating plate in a clockwise direction to turn the ground wheels toward the positions shown in broken lines in Fig. 2. By appropriate manipulation of the valve V, the wheels may thus be turned to any desired steering position, including the straight-ahead position.

The independent power steering provided for the trailer wheels enables the trailer to be moved into positions in which it could not otherwise be pulled or pushed by the tractor. Backing may be controlled with precision without the usual difficulties accompanying that maneuver. Additionally, the trailer may be steered to either side of the tractor and towed in such off-set relation if desired by returning the front wheels to the straight-ahead position after the trailer has been steered off to one side. The wheels, of course, can be locked in the straight-ahead position or any other selected position by setting the control valve in its neutral position.

In accordance with another aspect of the invention, novel latch means is provided by which the steering linkage can be coupled to the pole 26 so that the wheels are automatically turned to follow the tractor. The trailer can thus be conditioned for highway or conventional hauling operations in which it may be towed safely at high speeds. It also enables the trailer to be used with trailers or other powered vehicles not equipped with hydraulic systems.

When such steering is employed, the hydraulic steering mechanism is temporarily rendered ineffective. For latching the steering linkage to the pole, the forward edge of the operating plate is formed with a notch 66 (Fig. 7) adapted to aline with a similar notch 66' in a keeper bar 67 (Fig. 8) carried by the pole 26. The keeper bar, in this instance, is welded or otherwise secured to the underside of a mounting plate 68 extending across and welded to the legs 32 of the pole connecting bracket 31 as shown in Fig. 6.

Affixed to the upper face of the plate 68 is a socket member 69 having a bore 70 extending fore-and-aft in alinement with the notch 66'. Slidable in the bore is the shank portion 71 of a latch member which includes a depending nose portion or latch dog 72 extending over and adapted to fit into the notches 66 and 66' when the notches are alined in a vertical plane. A pin 72' (Fig. 6) projecting radially from the shank 71 and riding in a longitudinal groove in the wall of the bore 70 prevents the shank from rotating and maintains the latch dog 72 in positions to enter the notches. A coiled compression spring 73 interposed between the socket member 69 and a stop washer 74 held in place by a nut 75 threaded on the end of the shank 71 urges the dog toward the latching position or into the notches 66 and 66'. It will be understood, of course, that the notch 66 is positioned so that the steering linkage is locked to the pole in proper steering relation.

To permit selective engagement and disengagement of the latch mechanism means is provided by which the latch dog 72 may be retracted from the notches 66, 66' and held in withdrawn position. The retracting means, as shown in Fig. 4, comprises a hand lever 76 pivotally supported at its lower end on a bracket 77 fixed to the pole 26 forwardly of the latch mechanism. A tension link 78 connects the lever with an eye bolt 79 inserted through a hole in an upstanding bracket 80 welded to the upper end of the latch dog 72. The bolt 79 is resiliently connected with the bracket by a compression spring 81 interposed between the bracket and a stop washer 82 secured in place on the bolt as by a nut 83.

The lower end of the hand lever 76 may be bent forwardly as shown in Fig. 4 and the link is connected to the lever in a position such that when the lever is swung forwardly to lie against the pole 26, the point of connection is disposed below the pivotal axis of the lever. The lever is thus automatically locked in its latch releasing position and the dog 72 is held in a forward or disengaged position free of the notches 66, 66'. The steering linkage being thus disconnected from the pole 26, is conditioned for operation by the hydraulic actuator as previously described.

To condition the trailer wheels for steering by the pole 26, it is only necessary to swing the lever 76 to its rearward position allowing the spring 73 to enter the latch dog 72 in the notches 66, 66'. The hydraulic lock effected by the power actuator must also be disabled. For this purpose a by-pass 85 is provided between the ends of the cylinder 48, such by-pass being shown in Fig. 1 as a connection between the conduits 52 and 53. A valve V1 interposed in the by-pass permits it to be opened and closed as required for pole or power steering. Thus, when the valve V1 is closed the hydraulic system operates in the manner previously described. When the valve is opened, fluid circulates from one end of the actuator cylinder to the other as the wheels are turned mechanically in response to movements of the pole when the towing vehicle turns in either direction from a straight-ahead position. Since the piston rod 50 extends entirely through the cylinder 48 at both ends of the piston 51, the volumetric capacity of the cylinder is the same at both ends and interference with movements of the piston and steering linkage is completely absent.

Provision is made for preventing excessive movement of the trailer wheels and swinging of the pole 26. This means, as shown in Fig. 5, comprises a stop bar 86 disposed transversely of the pole and welded to the bracket 31 adjacent the latch plate 68. The projecting ends of the bar are beveled to present abutment surfaces 87 adapted to engage stop pads 88 provided on the axle when the pole 26 is swung in either direction to the selected limit positions.

It will be evident from the foregoing that the invention provides steering mechanism of a novel and advantageous character for vehicles adapted to be towed in trailing relation from a powered vehicle such as a tractor. When used with a tractor having a hydraulic system or other source of fluid under pressure, the improved steering mechanism permits the trailer wheels to be steered independently of the direction of movement of the towing vehicle or tractor and under complete control of the driver of the latter vehicle. Backing of the tractor-trailer combination can be effected easily and with complete safety without the usual difficulties encountered in backing vehicles coupled by an articulated connection. Moreover, the trailer can be quickly and accurately moved into positions into which it could not otherwise be pulled or pushed by the tractor.

The utility of the steering mechanism is further increased by the novel arrangement for connecting the steering linkage to the pole or traction member by which the trailer is towed by the tractor, while the hydraulic mechanism is rendered ineffective. When thus connected, the trailer automatically follows the tractor either straight-ahead or on turns and is thus conditioned for high speed towing along highways or other conventional hauling jobs. The trailer may also be used with tractors or other powered vehicles not equipped with hydraulic systems.

The improved hydraulic steering mechanism is particularly well adapted for use with tractors of the type having a hydraulic lift. Such tractors are commonly provided with connections for coupling to auxiliary actuators. The instant trailer requires only a simple valve and suitable flexible conduits for effecting the necessary hydraulic connections with tractors so equipped.

In general, it will be apparent that the improved steering mechanism, in addition to its versatility, is simple and inexpensive to manufacture. The mechanism is rugged in construction, has few parts subject to wear and capable of operating effectively for long periods with little or no attention. Moreover, it can be installed in trailers of conventional design without requiring substantial changes in the trailer structure.

I claim as my invention:

1. In a trailer having a pair of road wheels supported at opposite ends of an axle for pivotal steering movements and a pole pivotally connected to the axle and adapted to be coupled to a towing vehicle, in combination, a steering linkage connected to the respective wheels, a pressure fluid actuator operable through said linkage to impart steering movements to the wheels in either direction from a straight-ahead direction, latch means operable to releasably connect said linkage to the pole for imparting steering movements to the wheels in response to pivoting movements of the pole, and valve means for disabling said actuator when said latch means is engaged.

2. In a trailer having an axle with pivoted steering knuckles at each end supporting road wheels, in combination, a pole pivotally connected to the axle and adapted to be coupled to a towing vehicle, an operating plate supported on the axle to pivot about a common axis with said tongue, tie rods operatively connecting said plate with the respective knuckles, a pressure fluid operated actuator connected between the axle and said plate operative to swing the same on its pivot to impart steering movements to the road wheels to either side of a straight-ahead position, latch means operative to connect said plate to said pole to condition the pole for imparting steering movements to the vehicles, latch releasing means operable from the towing vehicle to free said plate for movement by said actuator, valve means settable selectively to direct pressure fluid to said actuator to turn the road wheels in either direction, and other valve means operable to prevent said actuator from interfering with the steering action of said pole when said latch is engaged.

3. The combination in a trailer adapted to be towed by a tractor having a source of pressure fluid and a fluid reservoir, said trailer having a front axle with pivoted steering knuckles at opposite ends supporting road wheels, an operating plate pivotally supported on the axle, tie rods operatively connecting said plate with the respective steering knuckles, a cylinder anchored to said plate at one side of its pivot, heads closing the ends of said cylinder, a piston in said cylinder having a piston rod extending through both of said heads, means pivotally securing one end of said rod to said axle, conduits communicating with opposite ends of said cylinder, and valve means operable manually to connect either of said conduits to the pressure fluid source on said tractor while connecting the other conduit to discharge to the fluid reservoir, said cylinder moving in one direction or the other along said piston rod to swing said operating plate and impart steering movements to the steering knuckles and wheels supported thereby.

4. The combination with a trailer adapted to be towed by a tractor having a source of fluid under pressure and a fluid reservoir, said trailer having a front axle with steering knuckles pivoted at opposite ends and supporting road wheels, a pole pivotally connected to said axle and adapted to be attached to the tractor, a steering linkage connecting said steering knuckles, a cylinder and piston actuator connected between said axle and said linkage, conduits connected to opposite ends of said cylinder, valve means operable to connect said conduits alternatively to the source of pressure fluid and to the reservoir on said tractor to impart steering movements to the trailer wheels by way of said linkage, cooperating elements in said linkage and on said pole for operatively connecting the linkage to the pole to transmit pivotal movements of the pole to the trailer wheels, and a by-pass permitting flow of fluid from one end of the cylinder to the other when the linkage is actuated by said pole.

5. The combination with a trailer adapted to be towed by a tractor having a source of fluid under pressure and a fluid reservoir, said trailer having a front axle with steering knuckles pivoted at opposite ends and supporting road wheels, a pole pivotally connected to said axle and adapted to be attached to the tractor, a steering linkage connecting said steering knuckles, a cylinder and piston actuator connected between said axle and said linkage, conduits connected to opposite ends of said cylinder, valve means operable to connect said conduits alternatively to the source of pressure fluid and to the reservoir on said tractor to impart steering movements to the trailer wheels by way of said linkage, cooperating elements in the linkage and on said pole for operatively connecting the linkage to the pole to transmit pivotal movements of the pole to the trailer wheels, means for temporarily disabling said actuator to free the linkage for movement by the pole including conduit means defining a by-pass between the ends of said cylinder, and a valve operable to open and close said by-pass.

References Cited in the file of this patent

UNITED STATES PATENTS

| | | |
|---|---|---|
| 2,029,540 | Porteous | Feb. 4, 1936 |
| 2,167,943 | Fox | Aug. 1, 1939 |
| 2,174,493 | Vanderwerf | Sept. 26, 1939 |
| 2,232,550 | McNamera | Feb. 18, 1941 |
| 2,316,397 | Briscoe | Apr. 13, 1943 |
| 2,687,900 | Thomas | Aug. 31, 1954 |
| 2,690,916 | Gilliam | Oct. 5, 1954 |

FOREIGN PATENTS

| | | |
|---|---|---|
| 930,847 | Germany | July 25, 1955 |